United States Patent
Wulff et al.

(10) Patent No.: US 9,514,184 B2
(45) Date of Patent: Dec. 6, 2016

(54) SYSTEMS AND METHODS FOR A HIGH SPEED QUERY INFRASTRUCTURE

(71) Applicant: Dropbox, Inc., San Francisco, CA (US)

(72) Inventors: Fred Wulff, San Francisco, CA (US); Vidhya Venkataraman, Berkeley, CA (US)

(73) Assignee: Dropbox, Inc., San Francisco, CA (US)

( * ) Notice: Subject to any disclaimer, the term of this patent is extended or adjusted under 35 U.S.C. 154(b) by 335 days.

(21) Appl. No.: 14/155,295

(22) Filed: Jan. 14, 2014

(65) Prior Publication Data

US 2015/0199408 A1    Jul. 16, 2015

(51) Int. Cl.
*G06F 17/30* (2006.01)

(52) U.S. Cl.
CPC ............... *G06F 17/30424* (2013.01)

(58) Field of Classification Search
CPC ........... G06F 17/30442; G06F 17/30463; G06F 17/30448; G06F 17/30672; G06F 17/30398; G06F 17/30474; G06F 17/30477; G06F 17/30545; G06F 17/30646
See application file for complete search history.

(56) References Cited

U.S. PATENT DOCUMENTS

| | | | |
|---|---|---|---|
| 5,987,452 A | 11/1999 | Kung | |
| 7,406,469 B1 | 7/2008 | Thiyagarajan | |
| 8,516,488 B1 * | 8/2013 | Brown | G06F 17/30463 707/718 |
| 9,063,957 B2 * | 6/2015 | Schroiff | G06F 17/30286 |
| 9,122,722 B2 * | 9/2015 | Collins | G06F 17/30463 |
| 2010/0005077 A1 | 1/2010 | Krishnamurthy et al. | |
| 2011/0010379 A1 | 1/2011 | Gilderman et al. | |
| 2011/0295838 A1 * | 12/2011 | Collins | G06F 17/30463 707/715 |
| 2013/0054630 A1 * | 2/2013 | Briggs | G06F 17/30427 707/760 |
| 2013/0060803 A1 | 3/2013 | Maman et al. | |
| 2015/0127680 A1 * | 5/2015 | Dutta | G06F 17/30424 707/771 |

* cited by examiner

*Primary Examiner* — Debbie Le
(74) *Attorney, Agent, or Firm* — Hickman Palermo Becker Bingham LLP

(57) ABSTRACT

In an analytics system, an analyst can analyze data by submitting queries, e.g., through an interface to a database. The analytics system can implement multiple query systems that are each configured to query the database. Query systems can be optimized for handling particular types of queries or for querying particular data. As such, some query systems can process certain queries more quickly and/or more efficiently than other query systems. To take advantage of this, when a query is received, query classification rules can be applied to the query. Based on the query classification, a query system can be selected to process the query, and the query can be sent to the selected query system for processing.

20 Claims, 5 Drawing Sheets

SYSTEMS AND METHODS FOR A HIGH SPEED QUERY INFRASTRUCTURE

BACKGROUND

The present disclosure relates generally to query-processing computer systems and in particular to systems for automatically selecting among different query systems to process queries.

Large-scale data analysis can help businesses achieve various goals. For example, online services continue to proliferate, including social networking services, online content management services, file-sharing services, and the like. Many of these services are supported by large-scale computing systems including server farms, network storage systems and the like. Making sure the resources are matched to current and future user demand is an important part of efficiently managing an online service, and analysis of large quantities of data can help the service provider understand and anticipate trends in demand. As another example, sales or advertising businesses may amass customer data such as who visits which websites, for how long, and whether or what they purchase. Making use of this data, e.g., to develop or revise a marketing strategy, requires processing large quantities of data.

Analytics systems typically implement a general purpose query system that can perform basic searches and complex data manipulation on data stored in an underlying database. Analyzing large quantities of data is an iterative process. An analyst may be presented with a problem or question and write a query to analyze a data set. The analyst can submit the query to the query system which interfaces with the database and returns a result of the query to the analyst. Based on the result, the analyst may choose to modify the query or write a different query to address the problem. This iterative query development process is similar to the process a software developer goes through when developing code. However, queries across large data sets can take a long time to execute, forcing analysts to wait before they can determine whether any changes need to be made to the query. Short waits allow analysts to stay on task and complete the project over the course of several iterations. However, long waits leave analysts idle, or force them to work on different projects, making development less efficient as the analysts must switch between projects and forcing analysts to remember where they left off. This leads to less efficient data analysis projects.

SUMMARY

Certain embodiments of the present invention relate to systems and methods for analyzing queries and determining how those queries should be executed in a computing system such as an analytics system. In an analytics system, an analyst can analyze data by submitting queries, e.g., through an interface to a database. The analytics system can implement multiple query systems that are each configured to query the database. Query systems can be optimized for handling particular types of queries or for querying particular data. As such, some query systems can process certain queries more quickly and/or more efficiently than other query systems. To take advantage of this, when a query is received, query classification rules can be applied to the query. Based on the query classification, a query system can be selected to process the query, and the query can be sent to the selected query system for processing.

The following detailed description together with the accompanying drawings will provide a better understanding of the nature and advantages of the present invention.

DETAILED DESCRIPTION

Certain embodiments of the present invention relate to systems and methods for analyzing queries and determining how those queries should be executed in a computing system such as an analytics system. In some embodiments, the system can provide a query system selector and query rules to facilitate the automatic selection of a query system to execute a particular query, without further user input.

For example, in some embodiments, queries can be received at an interface to a database. In some embodiments, the queries can be received at a query server that includes a query user interface (e.g., web interface, command line interface, or other user interface) from an analyst computer. The query can include code that defines operations to perform on data to produce output data. In some embodiments, query classification rules can be applied to the query to determine a query classification, and based on the query classification, a query system can be selected to execute the query. Some query systems can be optimized for particular data (e.g., particular databases or database tables), and/or can be optimized to work with data of particular sizes. Some query systems can be identified based on historical performance data as being able to execute particular queries more quickly. Once the query system is selected, the query can be sent to the selected query system for processing.

Figure 1:
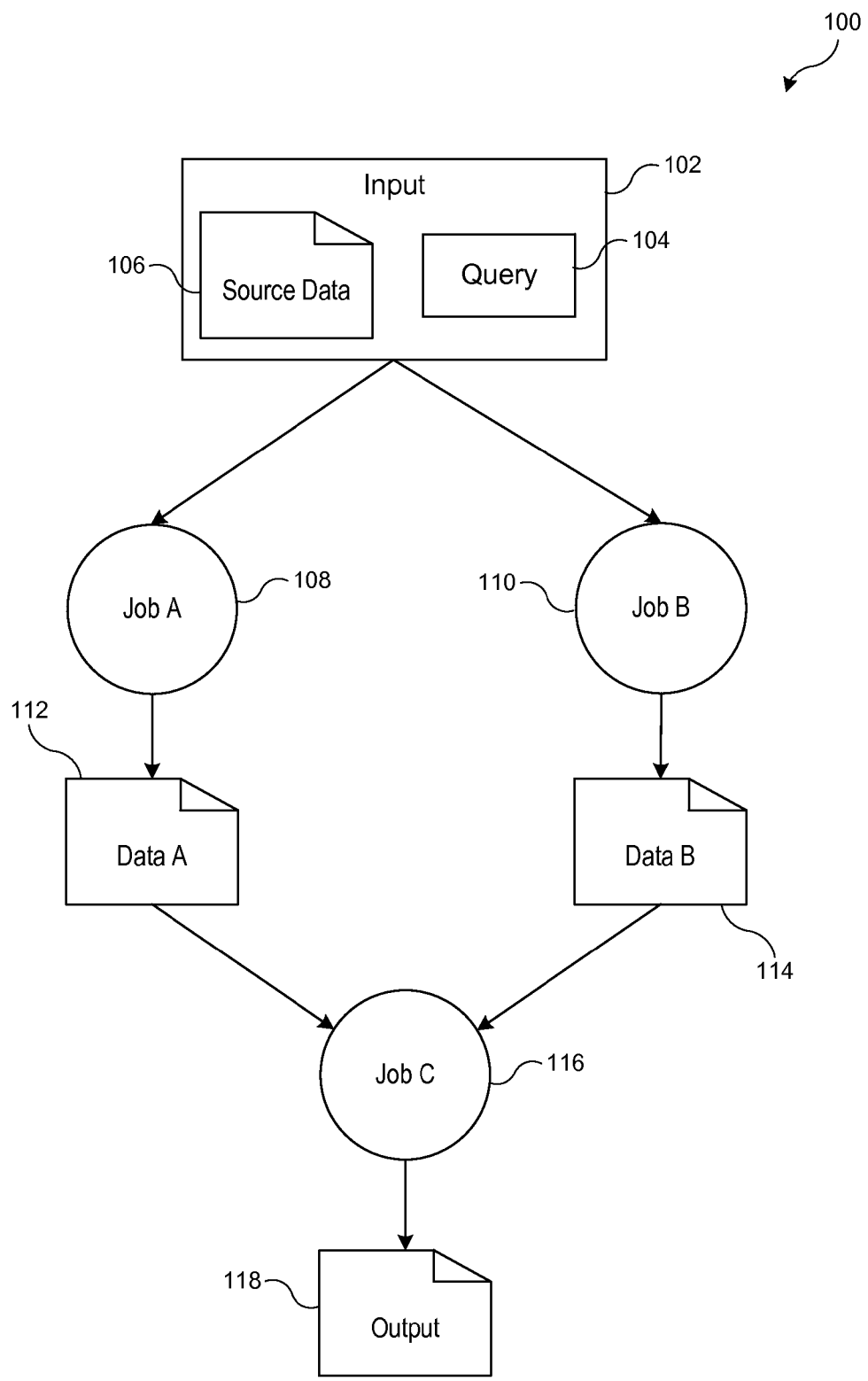
FIG. 1 shows an example of processing a query in an analytics system.

FIG. 1 shows an example of processing a query in an analytics system. As shown, a computer system, such as an analytics system, data warehouse interface, database interface, etc., may receive request 102 that can include query 104. Query 104 can identify data to be queried (e.g., a database, tables in a database, files, etc.) and include a number of operations to perform on the identified data. Queries can be performed on structured and/or unstructured data. For example, the database can include a table that includes user data (e.g., paid/not paid; last sign on and activity over the last 30 days) and another table that includes log info (e.g., indicating which pages each user has visited). An analyst can submit a query to the querying system to determine which users that have been active in the last 30 days and visited page X.

Depending on the query system, query 104 can be expressed in a programming language, a scripting language, a querying language, or other software code. For example, Hive can receive a SQL query from an analyst and transform the SQL query into a series of MapReduce jobs to be executed on a Hadoop database. In some embodiments, request 102 can include additional source data 106 not already stored in the database. Source data 106 can be added to the database or stored in memory prior to processing query 104.

As noted above, querying large data sets can be time consuming and processing intensive. To address these issues, databases can be implemented on distributed computing systems, such as systems implementing Hadoop™ distributed-application software and Hive™ data warehouse infrastructure (products of Apache Software Foundation). Other systems and software can also be used. A distributed computing system can implement a distributed processing model to more quickly process queries by parallel processing each query across a number of physical and/or virtual nodes in the distributed database.

One example of a distributed processing infrastructure is MapReduce, which has been implemented in a number of products, including Hadoop. When a query is received, it can be divided into a number of jobs spread across a number of nodes in a distributed database (this corresponds to the "map" phase of MapReduce). As shown in FIG. 1, processing of query 104 has been divided into job A 108 and job B 110. Although two jobs are shown, the number of jobs used to process any particular query may vary depending on the size of the data being processed and how many nodes of the distributed database it is stored on. Each job outputs associated data, e.g., data A 112 associated with job A 108 and data B 114 associated with job B 110. A "job" as used herein can include an operation (or a sequence of operations) as defined by a query to be executed on a portion of data stored in one node of a distributed database to produce output data for that node. These operations can include querying a database or data table and performing database operations on data tables (e.g., merge, join, deduplicate). In the example shown, each job produces a corresponding output data object: job A 108 produces data A 112; job B 110 produces data B 114. Although not shown in FIG. 1, in some instances, a single job can produce multiple data objects.

In some embodiments, data produced by a job can be intermediate data that is to be consumed by another job. For example, in a MapReduce system, the output of each node can be further processed (corresponding to the "reduce" phase) by one or more additional jobs to create output data that corresponds to the results of the received query. As shown in FIG. 1, data A 112 and data B 114 are consumed by job C 116. For example, as described above, jobs A 108 and B 110 can process different portions of the data being queried, such as source data 106 or other data stored in the distributed database. Therefore, the data produced by each job represents an incomplete answer to query 104. Job C 116 can process (e.g., merge, sort, etc.) the intermediate results embodied in data A 112 and data B 114, to produce output data 118 which represents the results of query 104.

In some embodiments, data consumed and/or produced by the various jobs can include any type of data or information available to or within an analytics system. This data can include "raw" input data such as user activity logs, database tables, or other source data. Jobs A 108 and B 110 can perform different operations on the same input data or the same operations on different input data or different operations on different input data as desired. As shown in FIG. 1, some jobs can depend on completion of other jobs. For example, job C 116 consumes data A 112 that is produced by job A 108 and data B 114 that is produced by job B 110.

Although the above-described query system is effective, it can be quite slow. Each received query is always translated into a set of MapReduce jobs which renders the system inflexible to certain kinds of optimizations. A variety of query systems exist, such as Shark/Spark, Impala, Apache Drill, Apache Hive, etc., each capable of reading a database (e.g., a Hadoop database) and extracting information, in real time or in batch mode. Different query systems can offer improved performance (e.g., in terms of response time and/or resource use) for certain classes of queries. For example, Impala, from Cloudera, provides a native SQL query engine that works directly with the underlying distributed database and does not rely on MapReduce or other intervening framework. Spark provides a distributed computing framework developed for iterative processing. Spark can cache data in memory which improves performance and avoids unnecessary file system I/O.

Although different query systems can improve performance for different classes of queries, some queries are incompatible with some query systems. As such, to realize performance gains in a system that receives many different types of queries, multiple query systems need to be implemented. However, this introduces additional work for each individual analyst who is then responsible for knowing which query system to use for a given query. Embodiments of the present invention address this issue by implementing a query infrastructure that includes a query system selector that can seamlessly switch between different query systems by analyzing the query received and automatically selecting a query system to process the query, without additional input from an analyst.

Figure 2:
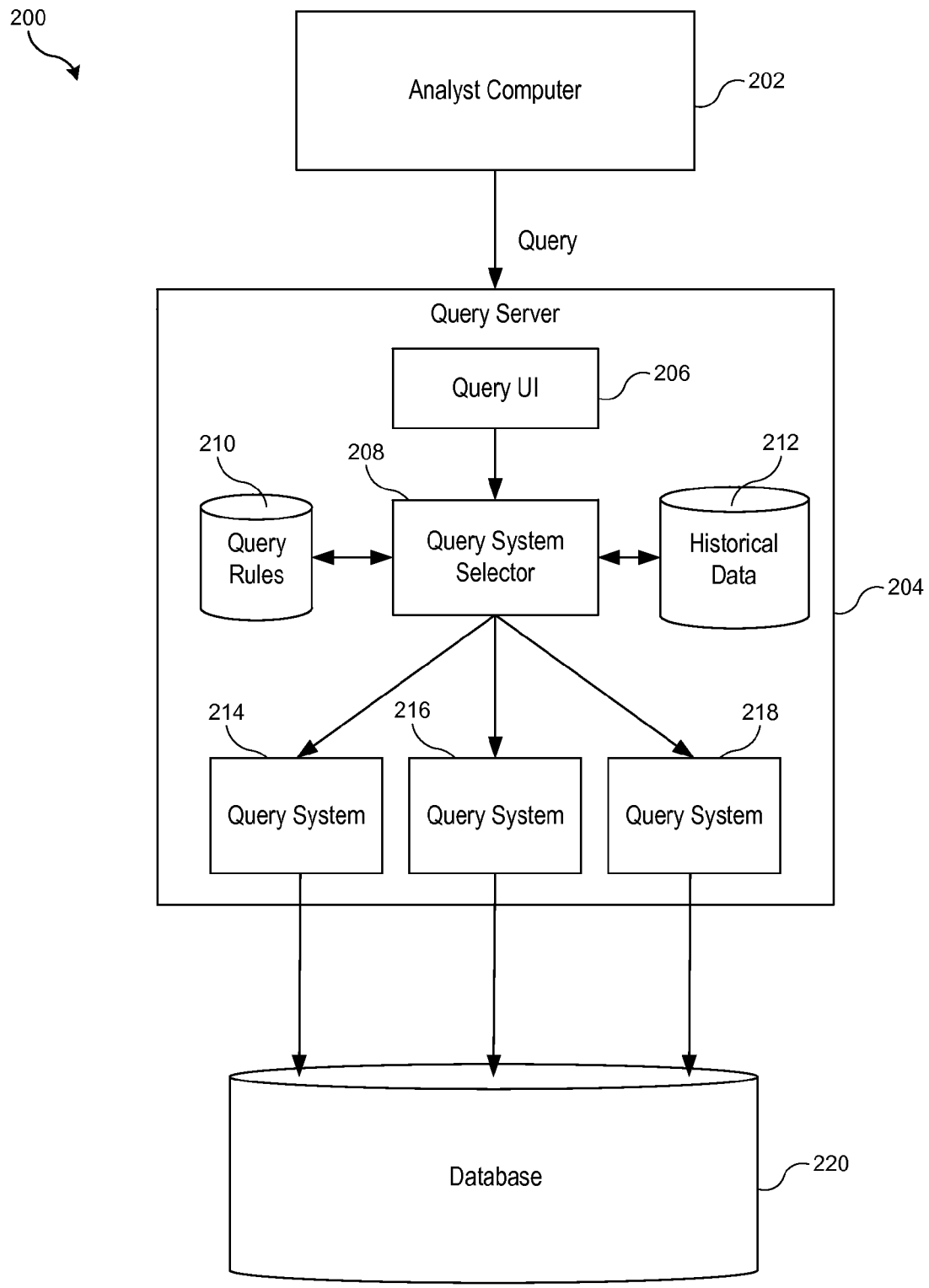
FIG. 2 is a simplified block diagram illustrating an analytics system including a query system selector, in accordance with an embodiment of the present invention.

FIG. 2 is a simplified block diagram illustrating an analytics system 200 including a query system selector, in accordance with an embodiment of the present invention. As shown in FIG. 2, an analyst can submit a query from analyst computer 202 to query server 204. The analyst can access query server 204 through query user interface (UI) 206. Query UI 206 can include a command line interface (CLI), web-based interface, or other suitable user interface. In some embodiments, analyst computer 202 can include a client application or web browser through which query UI 206 can be accessed. When a query is received through query UI 206, the query can be analyzed by query system selector 208 to determine a query system 214, 216, 218 to process the query. In some embodiments, query system selector 208 can send each query it receives to a default query system. For example, the default query system can be a query system that is expected to generally process a query more quickly, or more efficiently, than other available query systems. A developer, administrator, or other user can define the default query system in query system selector 208. If the query is successfully processed, the result is returned to analyst computer 202 without any additional processing required to identify a preferred query system. If the query fails, query system selector 208 can apply query rules 210 to the query.

As described below with reference to FIG. 4, query classification rules 210 can include rules for each query system that are based on query data. Query system selector 208 can identify query data by parsing the query to identify query characteristics, such as what data is to be queried, what operations are included in the query, a query identifier, etc. In some embodiments, a query can be parsed to identify the name (or names) of the data being queried, for example, table names, database names, data source or data set names, file names, etc. In some embodiments, query system selector 208 can identify additional query data using the query characteristics, e.g., query system selector 208 can look up the size of the data being queried. For example, query system selector 208 can create a new query requesting the size of the data being queried and submit the new query to the data being queried, and receive the size in response. Alternatively, or additionally, query system selector 208 can maintain a data structure that includes current sizes of commonly queried data sources. Query system selector 208 can periodically send queries to the commonly queried data sources to keep the size information current. Query classification rules 210 can be based on any combination of query data, for example a query classification rule can be defined to identify queries that join (an operation-based rule) two tables larger than a defined size (a size-based rule).

Query system selector 208 can apply query classification rules 210 to each received query to determine a query classification for each query. In some embodiments, a query classification can be an identifier that corresponds to a query system. In some embodiments, a query classification data structure can be maintained that maps query classifications to query systems. This provides a level of abstraction between query systems and query classifications, making it easier to update which query system is designated to process queries having a particular classification. For example, when new query systems are added and/or old query systems are updated, the query classification data structure can be updated without needing to update the historical data store for each past query. In some embodiments, the identifier can be a name of the corresponding query system. The query classification can be stored in historical data 212 for each query. In some embodiments, query classification rules 210 can be applied periodically to past queries to determine whether a query's classification has changed (for example, due to updated query classification rules).

In some embodiments, historical data 212 can be maintained for queries. Historical data 212 can include performance data (processing time, resources used, etc.) for each query in each query system 214, 216, 218. In some embodiments, each query can be processed by multiple query systems each time a query is received to compare performance of the query systems. For example, a query can be processed by query system 214 based on query rules 210, and the results returned to the analyst. The query can also be scheduled to be processed by query systems 216 and 218 when there are free system resources available to collect performance data. The performance data can then be added to historical data 212. In some embodiments, query rules 210 can be created and/or updated based on historical data 212. For example, if recent performance data indicates that queries involving two large tables are processed more quickly by query system 216 than by query systems 214 and 218, a rule can be created (or updated) to direct such queries to query system 216. Subsequently, if query system 214 is upgraded such that it now processes queries involving two large tables more quickly, the rule can be updated accordingly.

In some embodiments, after a query classification has been determined for a query, the query can be sent to a query system associated with that classification for processing. For example, the query system can be identified using the query classification data structure described above. In FIG. 2, each query system 214, 216, 218 is depicted as executing on query server 204, however alternative architectures are possible. For example, each query system can execute on a separate computer system or cluster of computer systems. In some embodiments, query server 204 can be a cluster of query servers receiving requests from multiple analyst computers. Each query system 214, 216, 218 is configured to query database 220. As described above, database 220 can be a distributed database implemented on a distributed computing system that includes a number of physical and/or virtual nodes.

Figure 3:
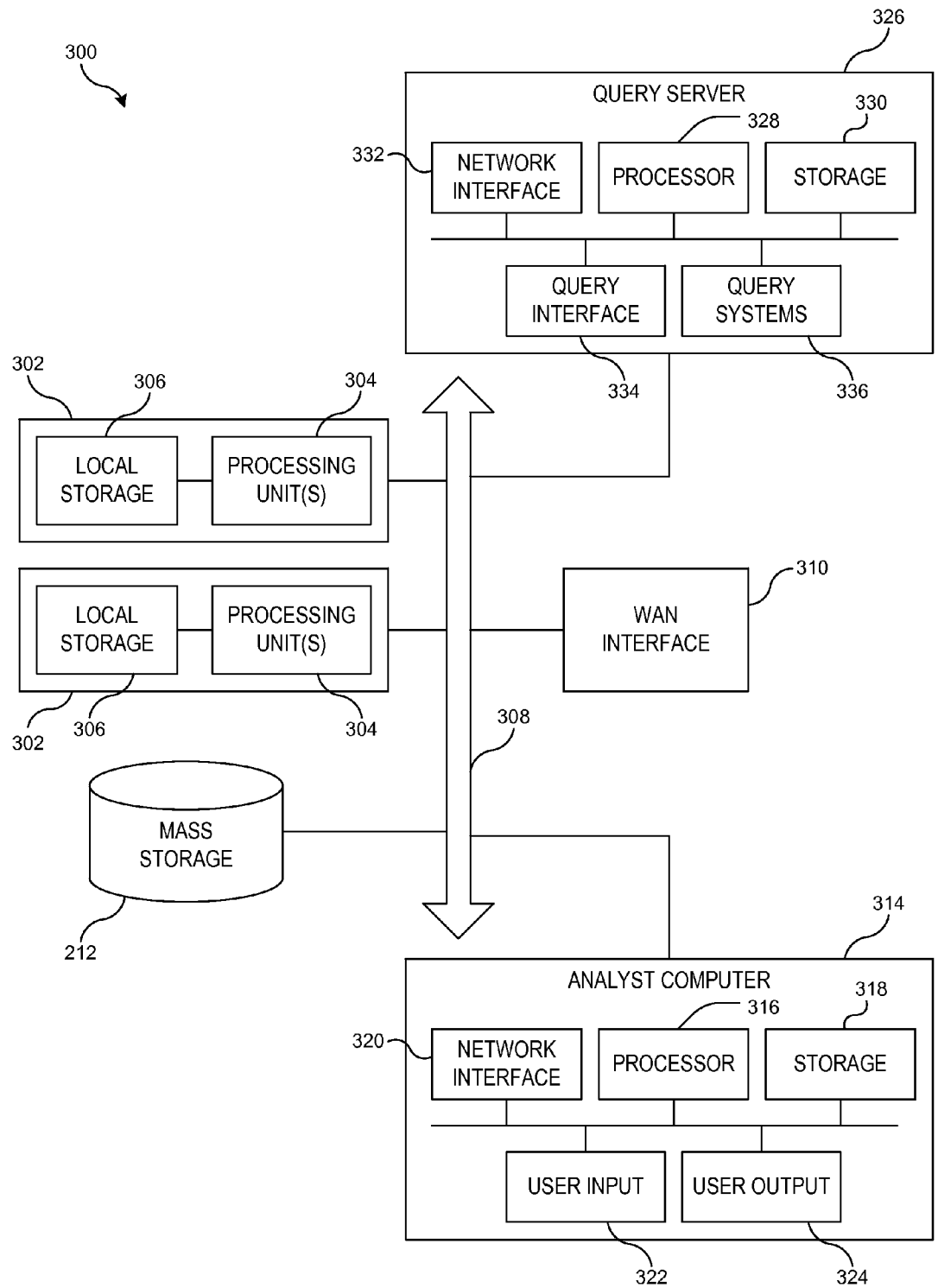
FIG. 3 shows a server system that can be used to implement an analytics system in a distributed-computing architecture, in accordance with an embodiment of the present invention.

The above-described computing systems can be implemented in a variety of standalone computer systems and/or distributed-computing architectures. FIG. 3 shows a server system 300 that can be used to implement an analytics system (or aspects thereof) in a distributed-computing architecture according to an embodiment of the present invention.

Server system 300 can have a modular design that incorporates a number of modules 302 (e.g., blades in a blade server implementation); while two modules 302 are shown, any number can be provided. Each module 302 can include processing unit(s) 304 and local storage 306. Server system 300 can implement a distributed database system where each module 302 serves as a physical node of the distributed database system.

Processing unit(s) 304 can include a single processor, which can have one or more cores, or multiple processors. In some embodiments, processing unit(s) 304 can include a general-purpose primary processor as well as one or more special-purpose co-processors such as graphics processors, digital signal processors, or the like. In some embodiments, some or all processing units 304 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 304 can execute instructions stored in local storage 306. Any type of processors in any combination can be included in processing unit(s) 304.

Local storage 306 can include volatile storage media (e.g., conventional DRAM, SRAM, SDRAM, or the like) and/or non-volatile storage media (e.g., magnetic or optical disk, flash memory, or the like). Storage media incorporated in local storage 306 can be fixed, removable or upgradeable as desired. Local storage 306 can be physically or logically divided into various subunits such as a system memory, a read-only memory (ROM), and a permanent storage device. System memory can include a read-and-write memory device, e.g., a volatile read-and-write memory, such as dynamic random access memory, and can store some or all of the instructions and data that processing unit(s) 304 need at runtime. ROM can store static data and instructions that are needed by processing unit(s) 306. Permanent storage devices can include a non-volatile read-and-write memory device, e.g., flash memory or magnetic disk, and can store instructions and data even when module 302 is powered down. The term "storage medium" as used herein includes any medium in which data can be stored indefinitely (subject to overwriting, electrical disturbance, power loss, or the like) and does not include carrier waves and transitory electronic signals passing wirelessly or over wired connections.

In some embodiments, local storage 306 can store one or more software programs to be executed by processing unit(s) 304, such as an operating system and/or programs implementing various functions, such as execution of all or part of a processing job or other processes as described herein. "Software" refers generally to sequences of instructions that, when executed by processing unit(s) 304 cause server system 300 (or portions thereof) to perform various operations, thus defining one or more specific machine implementations that execute and perform the operations of the software programs. The instructions can be stored as firmware residing in read-only memory and/or program code stored in non-volatile storage media that can be read into volatile working memory for execution by processing unit(s) 304. Software can be implemented as a single program or a collection of separate programs or program modules that interact as desired. From local storage 306 (or non-local storage described below), processing unit(s) 304 can retrieve program instructions to execute and data to process in order to execute various operations described herein.

In some server systems 300, multiple modules 302 can be interconnected via a bus 308, forming a local area network that supports communication between modules 302 and other components of server system 300. Bus 308 can be implemented using various technologies including server racks, hubs, routers, etc.

A wide area network (WAN) interface 310 can provide data communication capability between the local area network (bus 308) and a larger network, such as the Internet. Conventional or other communications technologies can be used, including wired (e.g., Ethernet, IEEE 802.3 standards) and/or wireless technologies (e.g., Wi-Fi, IEEE 802.11 standards).

In some embodiments, local storage 306 is intended to provide working memory for processing unit(s) 304, providing fast access to programs and/or data to be processed while reducing traffic on bus 308. Storage for larger quantities of data can be provided on the local area network by one or more mass storage subsystems 312 that can be connected to bus 308. Mass storage subsystem 312 can be based on magnetic, optical, semiconductor, or other data storage technologies. Direct attached storage, storage area networks, network-attached storage, and the like can be used. Any data stores or other collections of data described herein as being produced or consumed by servers can be stored in mass storage subsystem 312. In some embodiments, additional data storage resources may be accessible via WAN interface 310 (potentially with somewhat increased latency). Mass storage subsystem 312 can be used to store user activity logs, one or more databases that can include various data tables, and/or other large data objects, examples of which are described below. As described above, a Hadoop database is one example of a mass storage subsystem that can be used in embodiments of the present invention.

In some embodiments, server system 300 can operate in response to requests received via WAN interface 310 and/or query server 326. For example, each module 302 can be a different physical node in a distributed database system. Query processing can be divided into jobs that are assigned to the nodes. As requests are processed, results can be returned to the requester via WAN interface 310 and/or query server 326. Such operation can generally be automated. Further, in some embodiments, WAN interface 310 can connect multiple server systems 300 to each other, providing scalable solutions capable of managing high volumes of activity. Thus, a distributed computing architecture can be distributed across any number of physical computer systems without geographic constraint. Conventional or other techniques for managing server systems and server farms (collections of server systems that cooperate) can be used, including dynamic resource allocation and reallocation.

In some embodiments, analyst computer 314 can be provided to allow an analyst to interact directly with server system 300, e.g., for purposes of querying or otherwise analyzing data stored in server system 300. Analyst computer 314 can include conventional computer components such as a processor 316, storage device 318, network interface 320, user input device 322, and user output device 324. In some embodiments, analyst computer 314 can be physically remote from the rest of server system 300 and can be connected via WAN interface 310.

Processor 316 and storage device 318 can be similar to processing unit(s) 304 and local storage 306 described above. Suitable devices can be selected based on the demands to be placed on analyst computer 314; for example, analyst computer 314 can be implemented as a "thin" client with limited processing capability. Network interface 320 can provide a connection to bus 308 and/or directly to a WAN. User input device 322 can include any device (or devices) via which a user can provide signals to analyst computer 314; analyst computer 314 can interpret the signals as indicative of particular user requests or information. In various embodiments, user input device 322 can include any or all of a keyboard, touch pad, touch screen, mouse or other pointing device, scroll wheel, click wheel, dial, button, switch, keypad, microphone, and so on.

User output device 324 can include any device via which analyst computer 314 can provide information to a user. For example, user output device 324 can include a display to display images generated by or delivered to analyst computer 314. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 324 can be provided in addition to or instead of a display. Examples include indicator lights, speakers, tactile "display" devices, printers, and so on.

In some embodiments, query sever 326 can be provided to serve as an interface for server system 300, receiving requests from, and returning results to, an analyst computer 314. Query server 326 can include conventional computer components such as a processor 328, storage device 330, network interface 332, and query interface 334. As described above, in some embodiments query server 326 can include one or more query systems 336 that are configured to query a distributed database implemented on server system 300. In some embodiments, query server 326 can be physically remote from the rest of server system 300 and from analyst computer 314, and can be connected via WAN interface 310.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 304 can provide various functionality for server system 300, including any of the functionality described herein as being performed by a server, analytics system, or distributed processing system.

It will be appreciated that server system 300 is illustrative and that variations and modifications are possible. Server system 300 can have other capabilities not specifically described here. Further, while server system 300 is described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Figure 4:
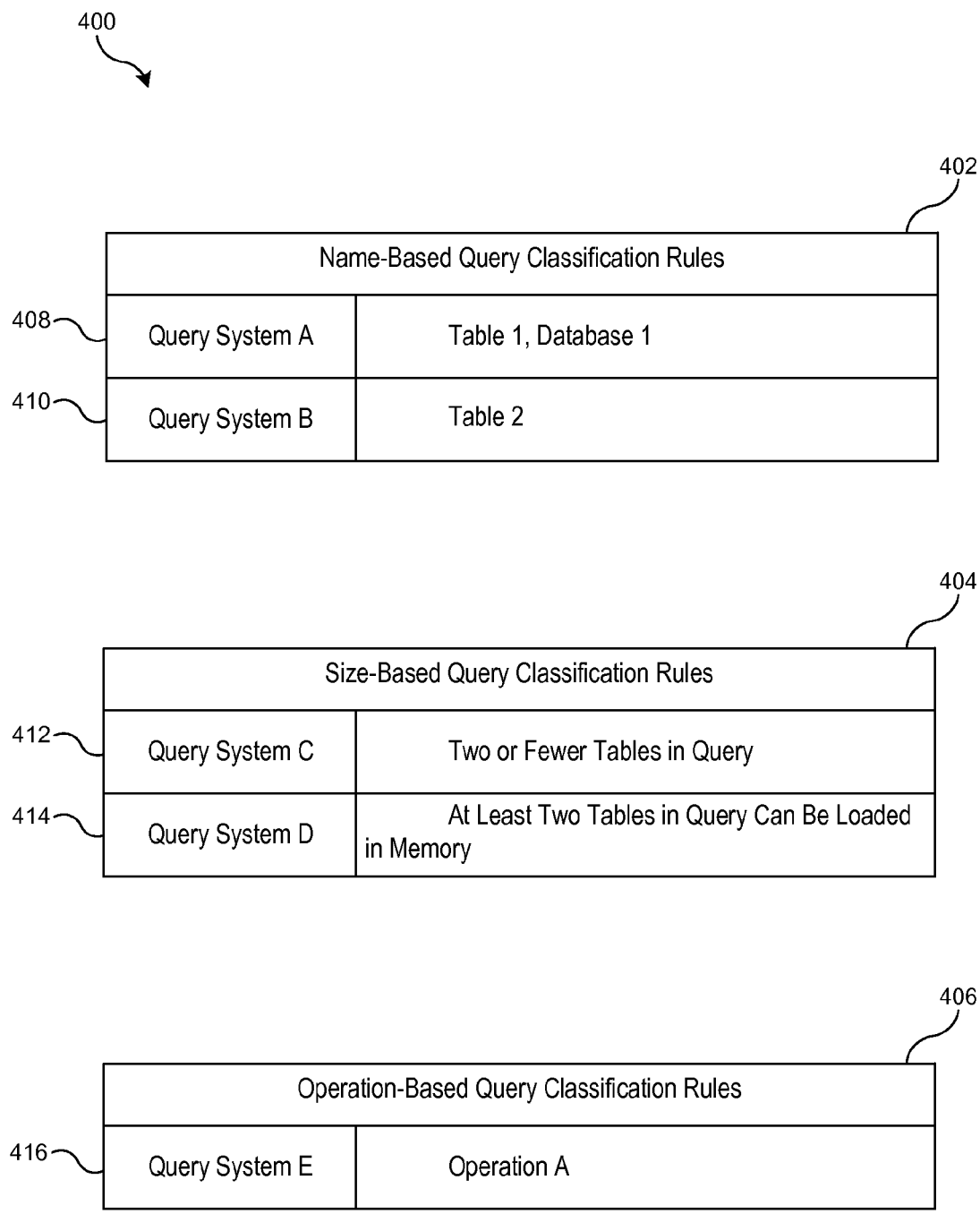
FIG. 4 shows examples of query classification rules, in accordance with an embodiment of the present invention.

FIG. 4 shows examples of query classification rules 400, in accordance with an embodiment of the present invention. As shown in FIG. 4, query classification rules 400 can include name-based query classification rules 402, size-based query classification rules 404, and operation-based query classification rules 406. As described above, query system selector 208 can parse a query to identify query characteristics (e.g., operations performed in the query, names and/or number of tables queried, etc.). Query system selector 208 can also determine additional query data based on the query characteristics, such as the size of the tables queried. Based on this information, query system selector 208 can apply query classification rules 210, such as exemplary query classification rules 400, to the query to determine a query classification and corresponding query system to process the query. Query classification rules 400 provided herein are merely examples. Any rules can be defined based on the query systems available in a given environment to direct queries to an appropriate query system in a given implementation environment.

Name-based query classification rules 402 can define a particular query system to use for queries that involve particular data, such as particular databases or particular database tables. As described above, many commonly used queries may involve a small number of data sources (e.g., comparing users tables and log tables), while other data sources are rarely or never queried. As such, performance gains can be realized by optimizing a query system for the commonly used data sources. As shown in FIG. 4, rule 408 can define Query System A for processing queries that involve Table 1 and/or Database 1 and rule 410 can define Query System B for processing queries that involve Table 2. Although two rules are shown, any number of name-based query classification rules can be defined.

In some embodiments, size-based query classification rules 408 can be defined for query systems that are optimized to query data sources of particular sizes (e.g., a query system can be optimized to query smaller data sources). In some embodiments, size-based query classification rules can be defined based on the number of data sources queried. For example, rule 412 can define Query System C to process queries that involve two or fewer tables (e.g., a join of two tables), and rule 414 can define Query System D to process queries where at least two tables in the query can be loaded into memory. Additional and/or alternative rules can be defined based on a combination of the size and/or number of data sources queried.

In some embodiments, operation-based query classification rules 406 can be defined for query systems that are optimized to perform particular operations on data sources. As shown in FIG. 4, rule 416 can define Query System E to process queries that involve Operation A (such as a Join or other SQL operation). Additional and/or alternative rules can be defined for any operation based on how available query systems have been optimized.

Although query classification rules 400 are described as being name-based, size-based, and operation-based, additional and/or alternative rules can be defined based on a combination of any query characteristics for which a query system has been optimized. For example, if a query system has been optimized for performing join operations on large data sources, a rule can be defined to send such queries to that query system.

In some embodiments, once query data has been parsed from a query, the query classification rules can be applied to the query data. Each query classification rule can be applied in turn to the query data and the first query rule to match the query data can return a query classification. In some embodiments, the query data parsed from a query can be used as input(s) to each rule, and the corresponding query classification can be returned as a result. For example, the query classification rules can each be implemented as a lookup table or other data structure that is indexed by query data, such as data source name, an identifier corresponding to a data source name such as a hash value, data source size, query operations, etc. The query can then be processed using the query system corresponding to the returned query classification.

As described above, in some embodiments query classification rules can be based on historical data. Query system selector 208 can maintain performance data for past queries processed by different query systems. When a query is processed, the query characteristics, the query system used and performance data (e.g., processing time, resources used, etc.) for processing the query can be stored. As described above, in some embodiments, the query can be processed again using one or more different query systems to determine performance data for that query using the different query systems. Many queries are made on a recurring basis. Rules can be defined for specific recurring queries to direct those queries to a query system based on an evaluation of the performance data across multiple query systems. For example, the query system that processed the query most quickly, or while consuming the fewest system resources, can be selected.

In some embodiments, a default rule can be defined that sends all queries received to a default query system. The default query system can be selected based on how quickly, or how efficiently, the query system processes queries. If the query is processed successfully, then the results are returned to the analyst without incurring any additional overhead associated with applying query classification rules 400 to the query. If the default query system returns an error, then query system selector 208 can apply query classification rules 400 to determine an appropriate query system to process the query. In some embodiments, the default query system is not associated with any query classifications.

Figure 5:
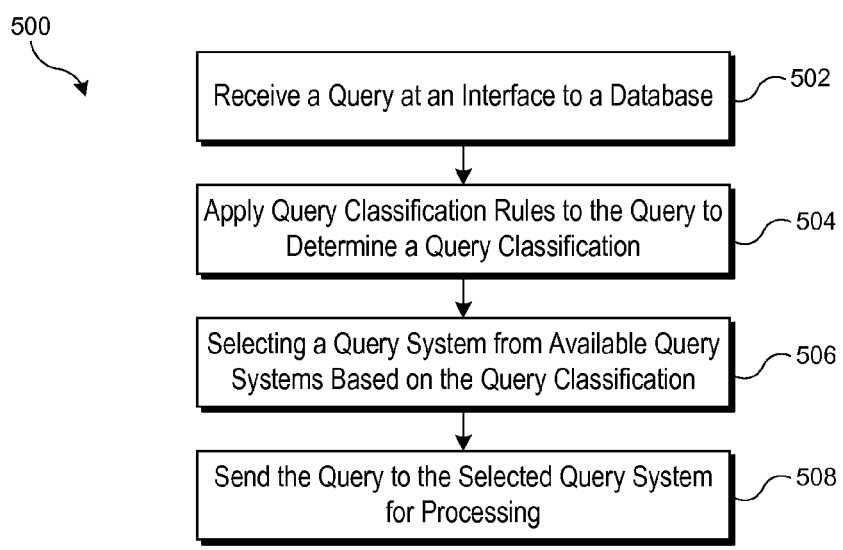
FIG. 5 shows a flow diagram of a process for automatically selecting a query system to process a query, in accordance with an embodiment of the present invention.

FIG. 5 shows a flow diagram of a process 500 for automatically selecting a query system to process a query, in accordance with an embodiment of the present invention. At block 502, a query is received at an interface to a database. As described above, the interface can be implemented on a query server or can be integrated into a database. At block 504, query classification rules can be applied to the query to determine a query classification. The query classification can be a name of a query system or an identifier corresponding to a query system. In some embodiments, the query classification rules can include size-based, name-based, and/or operation-based rules, or rules that include a combination of these characteristics.

At block 506, the query system corresponding to the query classification can be selected. In some embodiments, the query classification can be used as an input to a data structure that returns an identifier of the corresponding query system. At block 508, the query can be sent to the selected query system for processing. As described above, in some embodiments, after a query has been processed by the selected query system, the query can be repeatedly processed by other available query systems. Performance data for each additional processing can be stored and reviewed to determine if the selected query system was the correct choice for processing the query.

It will be appreciated that process 500 is illustrative and that variations and modifications are possible. Steps described as sequential can be executed in parallel, order of steps can be varied, and steps can be modified, combined, added or omitted. Process 500 (or similar processes) can allow a system to automatically select an appropriate query system to process a query received from a user. The query system can be selected by applying query classification rules to the received query without relying on the user to manually select the appropriate query system for a given query While the invention has been described with respect to specific embodiments, one skilled in the art will recognize that numerous modifications are possible. For example, the particular query rules, data structures, and computer systems described herein are used for purposes of illustration; other query rules, data structures, and computer systems can be substituted.

Embodiments described above can make reference to data structures and databases or data stores. It is to be understood that these terms can encompass any techniques for organizing information into discrete records that can be stored, retrieved and interpreted by computer systems.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded and stored on various computer readable storage media; suitable media include magnetic disk or tape, optical storage media such as compact disk (CD) or DVD (digital versatile disk), flash memory, and other non-transitory media. Computer readable media encoded with the program code can be packaged with a compatible electronic device, or the program code can be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A computer implemented method comprising:
   receiving a query at an interface to a database;
   applying one or more query classification rules to the query to determine a query classification;
   selecting a query system from a plurality of available query systems based on the query classification, wherein each of the available query systems is configured to process queries against the database in a different manner;
   wherein the different manner comprises at least one of a) different database data sources that each of the available query systems is optimized to process queries against, b) different numbers of database data sources that each of the available query systems is optimized to process queries against, or c) different query operations that each of the available query systems is optimized to process;
   wherein the query classification reflects at least one of a) a database data source the query is to be executed against, b) a number of database data sources the query is to be executed against, or c) an operation of the query to be performed on a database data source when the query is executed;
   wherein the different manner of the selected query system for processing queries against the database, relative to the different manners of the other query systems of the plurality of query systems for processing queries against the database, is optimized to process queries having the query classification according to the one or more query classification rules; and
   sending the query to the selected query system for processing.

2. The method of claim 1, wherein the query classification rules include one or more of:
   a size-based query classification rule;
   a name-based query classification rule; or
   an operation-based query classification rule.

3. The method of claim 1, further comprising:
   sending the query to each query system from the plurality of available query systems for processing;
   determining performance data for each query system processing the query; and
   recording the performance data for each query system in a historical data store.

4. The method of claim 3, further comprising:
   updating the query classification rules based on the performance datain the historical data store.

5. The method of claim 1, further comprising:
   before applying the one or more query classification rules to the query, sending the query to a default query system from the plurality of available query systems;
   if the default query system returns a result, sending the result to the interface to the database to be returned to an analyst; and
   if the default query system returns an error, then applying the one or more query classification rules to the query.

6. The method of claim 1, wherein applying one or more query classification rules to the query to determine a query classification further comprises:
   parsing the query to determine query characteristics;
   submitting the query characteristics to the one or more query classification rules; and receiving the query classification based on the query characteristics.

7. The method of claim 6, wherein selecting a query system from a plurality of available query systems based on the query classification, further comprises:
   looking up a query system in a query classification data structure based on the query classification.

8. A system comprising:
   a plurality of available query systems, wherein each of the available query systems is optimized to query a database in a different manner;
   wherein the different manner comprises at least one of a) different database data sources that each of the available query systems is optimized to process queries against, b) different numbers of database data sources that each of the available query systems is optimized to process queries against, or c) different query operations that each of the available query systems is optimized to process;
   a query system selector executing on at least one server including a computer readable medium and processor, wherein the query system selector is configured to:
   receive a query from an analyst computer;
   apply one or more query classification rules to the query to determine a query classification;
   wherein the query classification reflects at least one of a) a database data source the query is to be executed against, b) a number of database data sources the query is to be executed against, or c) an operation of the query to be performed on a database data source when the query is executed;
   select a query system from the plurality of query systems based on the query classification;
   wherein the different manner of the selected query system for processing queries against the database, relative to the different manners of the other query systems of the plurality of available query systems for processing queries against the database, is optimized to process queries having the query classification according to the one or more query classification rules; and
   send the query to the selected query system for processing.

9. The system of claim 8, wherein the query classification rules include one or more of:
   a size-based query classification rule;
   a name-based query classification rule; or
   an operation-based query classification rule.

10. The system of claim 8, wherein the query system selector is further configured to:
    send the query to each query system from the plurality of available query systems for processing;
    determine performance data for each query system processing the query; and
    record the performance data for each query system in a historical data store.

11. The system of claim 10, wherein the query system selector is further configured to:
    update the query classification rules based on the performance data in the historical data store.

12. The system of claim 8, wherein the query system selector is further configured to:
    before applying the one or more query classification rules to the query, send the query to a default query system from the plurality of available query systems;
    if the default query system returns a result, send the result to an interface to the database to be returned to an analyst; and
    if the default query system returns an error, then apply the one or more query classification rules to the query.

13. The system of claim 8, wherein applying one or more query classification rules to the query to determine a query classification, further comprises:
    parsing the query to determine query characteristics;
    submitting the query characteristics to the one or more query classification rules; and
    receiving the query classification based on the query characteristics.

14. The system of claim 13, wherein selecting a query system from a plurality of available query systems based on the query classification further comprises:
    looking up a query system in a query classification data structure based on the query classification.

15. A computer implemented method comprising:
    parsing a query to determine query characteristics, wherein the query characteristics include at least one data source identifier and at least one operation;
    submitting the query characteristics to a set of query classification rules, wherein the set of query classification rules returns a query classification;
    selecting a query system to process the query from a plurality of available query systems based on the query classification, wherein each of the available query systems is optimized to query a database in a different manner;
    wherein the different manner comprises at least one of a) different database data sources that each of the available query systems is optimized to process queries against, b) different numbers of database data sources that each of the available query systems is optimized to process queries against, or c) different query operations that each of the available query systems is optimized to process;
    wherein the query classification reflects at least one of a) a database data source the query is to be executed against, b) a number of database data sources the query is to be executed against, or c) an operation of the query to be performed on a database data source when the query is executed; and
    wherein the different manner of the selected query system for processing queries against the database, relative to the different manners of the other query systems of the plurality of available query systems for processing queries against the database, is optimized to process queries having the query classification according to the set of query classification rules.

16. The method of claim 15, further comprising:
    determining a size of the at least one data source corresponding to the at least one data source identifier, wherein the size of the at least one data source is submitted with the query characteristics to the set of query classification rules.

17. The method of claim 16, wherein determining a size of the at least one data source includes submitting a new query to the at least one data source and receiving the size of the at least one data source in response.

18. The method of claim 15, further comprising:
    scheduling times for each query system to process the query;
    monitoring processing of the query by each query system to determine performance data; and
    storing the performance data in a historical data store.

19. The method of claim 18, wherein the performance data includes processing time and resources used.

20. The method of claim 15, further comprising:
 storing the query characteristics and the query classification in a historical data store;
 periodically submitting the query characteristics to the set of query classification rules to determine whether the query classification has changed; and
 when the query classification has changed; updating the historical data store.

\* \* \* \* \*